(12) United States Patent
Andres et al.

(10) Patent No.: US 11,630,508 B1
(45) Date of Patent: Apr. 18, 2023

(54) APPARATUSES AND METHODS FOR SECURELY PRESENTING DIGITAL OBJECTS

(71) Applicant: Wells Fargo Bank, N.A., San Francisco, CA (US)

(72) Inventors: Amanda Jean Andres, Smithton, IL (US); John Patrick Decker, Jr., Saint Louis, MO (US); Darrell Todd Slawson, St. Louis, MO (US); Jonathan Paul Sidarous, House Springs, MO (US); Melissa Leisse, Fenton, MO (US); Chelsea Murphy, Saint Louis, MO (US); Allison Rayfield, St. Louis, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/900,256

(22) Filed: Jun. 12, 2020

(51) Int. Cl.
*G06F 3/01* (2006.01)
*G02B 27/01* (2006.01)
*G06T 19/00* (2011.01)

(52) U.S. Cl.
CPC ......... *G06F 3/013* (2013.01); *G02B 27/0172* (2013.01); *G06T 19/006* (2013.01); *G02B 2027/014* (2013.01); *G02B 2027/0138* (2013.01)

(58) Field of Classification Search
CPC .............. G06F 3/013; G02B 27/0172; G02B 2027/0138; G06T 19/006
See application file for complete search history.

(56) References Cited

U.S. PATENT DOCUMENTS

| | | | |
|---|---|---|---|
| 9,363,569 B1* | 6/2016 | van Hoff | H04N 21/4223 |
| 10,032,225 B1* | 7/2018 | Fox | G06Q 20/321 |
| 10,831,267 B1* | 11/2020 | Golard | G06F 3/013 |
| 10,831,268 B1* | 11/2020 | Golard | G06F 3/167 |
| 2002/0169747 A1* | 11/2002 | Chapman | G06Q 40/12 |
| 2012/0154557 A1* | 6/2012 | Perez | H04N 21/47205 |
| | | | 348/53 |
| 2014/0026156 A1* | 1/2014 | Deephanphongs | |
| | | | H04N 21/4223 |
| | | | 725/12 |
| 2016/0004306 A1* | 1/2016 | Maltz | G06F 3/013 |
| | | | 345/173 |

(Continued)

OTHER PUBLICATIONS

Castagnos, S., Jones, N., & Pu, P. (Sep. 2010). Eye-tracking product recommenders' usage. In Proceedings of the fourth ACM conference on Recommender systems (pp. 29-36).*

*Primary Examiner* — Sarah Lhymn
(74) *Attorney, Agent, or Firm* — Womble Bond Dickinson (US) LLP

(57) ABSTRACT

Apparatuses, methods, and computer program products are provided for securely presenting digital objects. An example method includes receiving a request for digital object review and causing visual presentation of the digital object to a user. The method further includes receiving one or more images of the user's eye captured during presentation of the digital object and determining a focus location represented by the one or more images. The method also includes modifying one or more user parameters associated with the user based on the focus location. In some instances, presentation of the digital object may be rendered in a virtual reality environment or may be overlaid as an augmented reality object in the field of view of the user.

20 Claims, 5 Drawing Sheets

(56) References Cited

U.S. PATENT DOCUMENTS

| | | | | |
|---|---|---|---|---|
| 2017/0046906 A1* | 2/2017 | Hilbert | ............... | G07F 17/3209 |
| 2017/0078447 A1* | 3/2017 | Hancock | ............... | G06F 1/3215 |
| 2017/0323485 A1* | 11/2017 | Samec | ............... | A61B 3/113 |
| 2018/0012408 A1* | 1/2018 | Gentilin | ............... | G06F 3/012 |
| 2018/0192057 A1* | 7/2018 | Ardo | ............... | H04N 19/162 |
| 2019/0196576 A1* | 6/2019 | Saarinen | ............... | G06F 3/013 |
| 2021/0335085 A1* | 10/2021 | Froy, Jr. | ............... | G06T 7/70 |

* cited by examiner

APPARATUSES AND METHODS FOR SECURELY PRESENTING DIGITAL OBJECTS

TECHNOLOGICAL FIELD

Example embodiments of the present disclosure relate generally to customer insights and, more particularly, to the use of securely presented digital objects to improve customer interactions.

BACKGROUND

Many institutions, entities, businesses, and the like often require that a customer review, sign, or otherwise acknowledge various forms in order to perform an action with these entities. For example, in order for a user to open an account or perform a transaction with a financial institution, the user may be required to review and complete various documents. In many instances, a user may also be required to visit a physical location in order to complete this process.

BRIEF SUMMARY

As described above, financial institutions and other entities may utilize a variety documents or forms in the normal course of interacting with their customers. Customers may, for example, enter a physical branch of a financial institution and review numerous documents in order to open an account with this institution. Given the volume of text presented to the customer, in many instances, customers may be reluctant to provides questions regarding the content of the document or may fail to review portions of the documents. Customers are also becoming increasingly concerned with the privacy of their personal information and may be wary of the use of physical documents that may be misplace or viewed by others. Furthermore, the options provided to a customer at a physical location may be limited due to the availability of select employees (e.g., those tasked with handling a particular action), due to technology limitations (e.g., particular equipment only located at select locations), or the like.

To solve these issues and others, example implementations of embodiments of the present disclosure may leverage virtual reality (VR) and/or augmented realty (AR) to provide a secure environment for customer interactions. In operation, embodiments of the present disclosure may receive a request for digital object review (e.g., documents or the like) and may cause visual presentation of the digital object to the user in a VR or AR environment. During review of the digital object in the VR or AR environment, the system may capture images of the user's eye to determine one or more focus locations of the user with respect to the digital object. As such, the system may operate to determine or otherwise map locations of interest of the digital object (e.g., associated with increased focus of the user) while protecting private user information in the VR or AR environment (e.g., only viewable by the user). In this way, the inventors have identified that the advent of emerging computing technologies have created a new opportunity for solutions for securely presenting digital content and determining customer insights which were historically unavailable. In doing so, such example implementations confront and solve at least two technical challenges: (1) they reliably secure user data from unauthorized viewing, and (2) they determine customer insights in a virtual environment (e.g., without the need for physical forms).

As such, apparatuses, methods, and computer program products are provided for securely presenting digital objects. With reference to an example method, the example method may include receiving, by a computing device, a request for digital object review and causing, by display circuitry of the computing device, visual presentation of the digital object to a user. The method may further include receiving, by gaze detection circuitry, one or more images of the user's eye captured during presentation of the digital object and determining, by the gaze detection circuitry, a focus location represented by the one or more images. The method may also include modifying, by object analysis circuitry of the computing device, one or more user parameters associated with the user based on the focus location.

In some embodiments, causing presentation of the digital object to the user may further include generating, via virtual reality circuitry of the computing device, a virtual reality environment. In such an embodiment, the method may include rendering, via the virtual reality circuitry, the digital object in the virtual reality environment.

In other embodiments, causing presentation of the digital object to the user may further include overlaying, via augmented reality circuitry of the computing device, the digital object in a field of view of the user.

In some embodiments, the method may further include augmenting, via the object analysis circuitry, the digital object based on the one or more parameters of the user. In such an embodiment, augmenting the digital object may further include generating, via the object analysis circuitry, a visual representation of the focus location on the digital object.

In some embodiments, the method may also include transmitting, via the computing device, a notification to the user comprising one or more modified user parameters.

In some embodiments, determining the focus location may further include identifying, via the gaze detection circuitry, a gaze direction of the user's eye. The method may further include comparing, via the gaze detection circuitry, the gaze direction of the user's eye with a corresponding location defined by the digital object and determining, via the gaze detection circuitry, the focus location based upon a correlation between the gaze direction and the corresponding location of the digital object.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
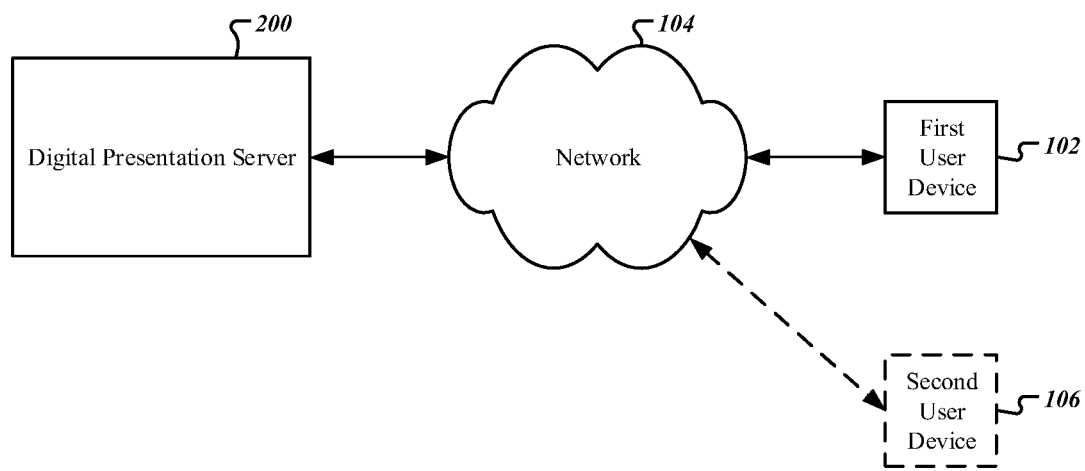
FIG. 1 illustrates a system diagram including devices that may be involved in some example embodiments described herein.

Some embodiments of the present disclosure will now be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a digital presentation server as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "user device," "first user device," "second user device," and the like refer to computer hardware and/or software that is configured to access a service made available by the digital presentation server and, among various other functions, is configured to directly, or indirectly, transmit and receive data. Example user devices may include a smartphone, a tablet computer, a laptop computer, a wearable device (e.g., smart glasses, smartwatch, or the like), virtual reality (VR) headset, augmented reality (AR) device and the like. In some embodiments, a user device may include a "smart device" that is equipped with chip of other electronic device that is configured to communicate with the digital presentation server via Bluetooth, NFC, Wi-Fi, 3G, 4G, 5G, RFID protocols, and the like. By way of a particular example, a first user device may be an virtual or augmented reality device (e.g., VR headset, smart glasses, etc.) associated with a first user (e.g., customer), and a second user device may a virtual or augmented reality device (e.g., VR headset, smart glasses, etc.) associated with a second user (e.g., financial advisory or other banking employee), where each user device is equipped with a Wi-Fi radio that is configured to communicate with a Wi-Fi access point that is in communication with the a server (e.g., a digital presentation server of the present disclosure) via a network.

As used herein, the term "user parameters" may refer to a collection of settings, configurations, identifiers, data, and information associated with a user and associated user device. User parameters configured in accordance with the present disclosure may be stored by an associated user device, user profile, or the like and may be accessible by one or more of the software applications that are supported by the digital presentation server and, thus, may include application-specific preferences, settings, configurations, data, and information. In some example embodiments, user parameters of a first user may include account information, preferences, transaction information, and/or the like associated with the first user as described hereafter.

As used herein, the terms "virtual reality" or "VR" may refer to a user simulation or simulated experience in which a user's physical presence is provided in a virtual environment. Such a virtual environment may include any number of artificial items, features, or the like with which the user may interact. Furthermore, a VR environment may include various forms of feedback to a user's interactions (e.g., audio or tactile feedback) and may utilize associated VR headsets, head-mounted displays, or multi-projected environments. Similarly, the terms "augmented reality" or "AR" may refer to an interactive experience that enhances objects in a real-world environment. Said differently, AR may combine real and virtual worlds or items and, in some instances, may operate as an overlay of a user's real environment. As opposed to virtual reality in which a user's environment is partially or completed simulated, an augmented reality environment may only project virtual items into a user's field of view. An AR environment may utilize associated AR headsets, smart glasses, displays, or the like in order to enhance the user's real world environment.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a digital presentation server 200) communicably connected via a network 104 to a first user device 102, and, in some embodiments, a second user device 106. Although illustrated connected to the digital presentation server 200 via a network 104, the present disclosure contemplates that one or more of the first user device 102 and/or the second user device 106 may be hosted and/or stored by the digital presentation server 200.

The digital presentation server 200 may include circuitry, networked processors, or the like configured to perform some or all of the apparatus-based (e.g., digital presentation server-based) processes described herein, and may be any suitable network server and/or other type of processing device. In this regard, digital presentation server 200 may be embodied by any of a variety of devices. For example, the digital presentation server 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the digital presentation server 200 may be located remotely from the first user device 102 and/or the second user device 106, although in other embodiments, the digital presentation server 200 may comprise the first user device 102 and/or the second user device 106. The digital presentation server 200 may, in some embodiments, comprise several servers or computing devices performing interconnected and/or distributed functions. Despite the many arrangements contemplated herein, the digital presentation server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first user device 102 may be associated with a first user (e.g., customer) and may be configured to store or access various user parameters associated with the first user. Although a single first user device 102 is shown in FIG. 1, the example system 100 may include any number of user devices associated with the first user. The first user device 102 may be a cellular telephone (including smartphones and/or other types of mobile telephones), laptop, tablet, electronic reader, e-book device, media device, wearable, smart glasses, smartwatch, VR device, AR device, or any combination of the above. The first user device 102 may be communicably coupled with the digital presentation server 200, via the network 104, and configured to transmit data to and receive data from the digital presentation server 200. By way of example, the first user device 102 may include VR or AR device configured to generate a VR environment or AR overlay, respectively, for viewing by the first user.

In some embodiments, the second user device 106 may be associated with a second user (e.g., employee of financial institution) and may be configured to store or access various user parameters associated with the second user. Although a single second user device 106 is shown in FIG. 1, the example system 100 may include any number of user devices associated with the second user. The second user device 106 may be a cellular telephone (including smartphones and/or other types of mobile telephones), laptop, tablet, electronic reader, e-book device, media device, wearable, smart glasses, smartwatch, VR device, AR device, or any combination of the above. The second user device 106 may be communicably coupled with the digital presentation server 200, via the network 104, and configured to transmit data to and receive data from the digital presentation server 200. By way of example, the second user device 106 may include VR or AR device configured to generate a VR environment or AR overlay, respectively, for viewing by the second user.

Figure 2:
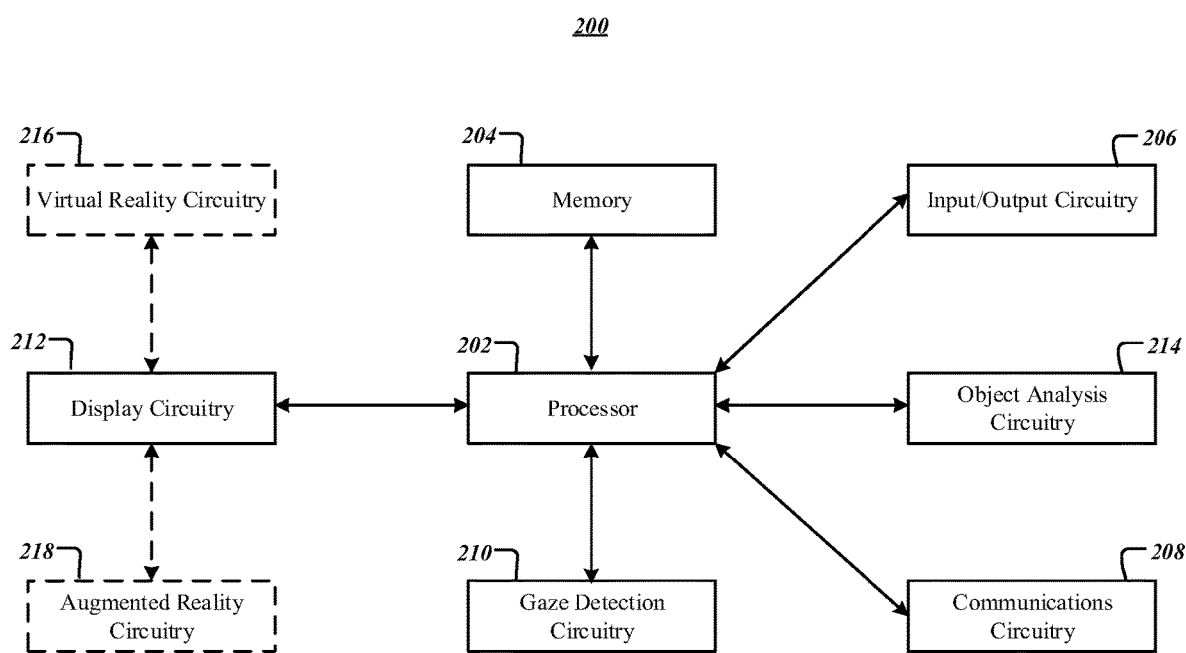
FIG. 2 illustrates a schematic block diagram of example circuitry that may perform various operations, in accordance with some example embodiments described herein.

As illustrated in FIG. 2, the digital presentation server 200 may include a processor 202, a memory 204, communications circuitry 208, and input/output circuitry 206. Moreover, the digital presentation server 200 may include gaze detection circuitry 210, object analysis circuitry 214, and/or display circuitry 212. The digital presentation server 200 may be configured to execute the operations described below in connection with FIGS. 3-5. Although components 202-218 are described in some cases using functional language, it should be understood that the particular implementations necessarily include the use of particular hardware. It should also be understood that certain of these components 202-218 may include similar or common hardware. For example, two sets of circuitry may both leverage use of the same processor 202, memory 204, communications circuitry

208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the digital presentation server 200 may be housed within the first user device 102, and/or the second user device 106. It will be understood in this regard that some of the components described in connection with the digital presentation server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the digital presentation server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the digital presentation server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the digital presentation server 200 to carry out various functions in accordance with example embodiments of the present disclosure.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the digital presentation server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The digital presentation server 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the digital presentation server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the digital presentation server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The gaze detection circuitry 210 includes hardware components designed to capture one or more images of a user's eye during review of a digital object and analyze said images. In particular, the gaze detection circuitry may identify a gaze direction of a user's eye and compare this gaze direction with a corresponding location defined by a digital object. The gaze detection circuitry 210 may utilize processing circuitry, such as the processor 202, to perform its corresponding operations, and may utilize memory 204 to store collected information.

The display circuitry 212 includes hardware components designed to cause visual presentation of a digital object to a user. In some embodiments, the display circuitry 212 may further leverage virtual reality circuitry 216 to generate a virtual reality environment and render the digital object in the virtual reality environment. Similarly, in some embodiments, the display circuitry 212 may further leverage augmented reality circuitry 218 to overlay the digital object in the field of view of the user (e.g., in a real world environment). The display circuitry 212, the virtual reality circuitry 216, and/or the augment reality circuitry 218 may utilize processing circuitry, such as the processor 202, to perform its corresponding operations, and may utilize memory 204 to store collected information.

The object analysis circuitry 214 includes hardware components designed to modify one or more user parameters associated with a user based on a determined focus location.

In some embodiments, the object analysis circuitry 214 may generate a visual representation of the focus location on the digital object. The object analysis circuitry 214 may utilize processing circuitry, such as the processor 202, to perform its corresponding operations, and may utilize memory 204 to store collected information.

It should also be appreciated that, in some embodiments, the gaze detection circuitry 210, display circuitry 212, object analysis circuitry 214, virtual reality circuitry 216, and/or augmented reality circuitry 218 may include a separate processor, specially configured field programmable gate array (FPGA), or application specific interface circuit (ASIC) to perform its corresponding functions.

In addition, computer program instructions and/or other type of code may be loaded onto a computer, processor, or other programmable digital presentation server's circuitry to produce a machine, such that the computer, processor other programmable circuitry that execute the code on the machine create the means for implementing the various functions, including those described in connection with the components of digital presentation server 200.

As described above and as will be appreciated based on this disclosure, embodiments of the present disclosure may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Securely Presenting Digital Objects

Figure 3:
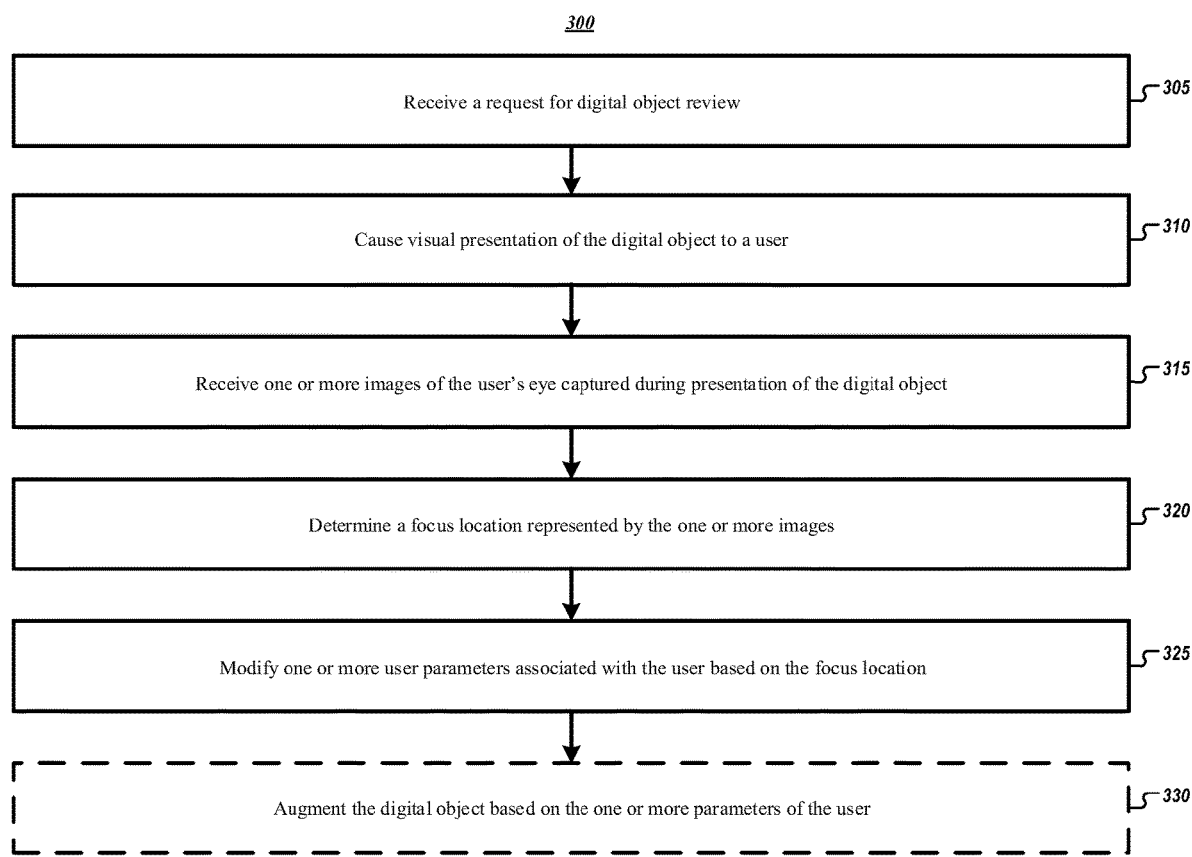
FIG. 3 illustrates an example flowchart for securely presenting digital objects, in accordance with some example embodiments described herein.

FIG. 3 illustrates a flowchart containing a series of operations for generating user connections. The operations illustrated in FIG. 3 may, for example, be performed by, with the assistance of, and/or under the control of an apparatus (e.g., digital presentation server 200), as described above. In this regard, performance of the operations may invoke one or more of processor 202, memory 204, input/output circuitry 206, communications circuitry 208, gaze detection circuitry 210, display circuitry 212, object analysis circuitry 214, virtual reality circuitry 216, and/or augmented reality circuitry 218.

As shown in operation 305, the apparatus (e.g., digital presentation server 200) includes means, such as input/output circuitry 206, communications circuitry 208, or the like, for receiving a request for digital object review. As described above, the first user device 102 may be associated with a first user and may, in some embodiments transmit the request for digital object review at operation 305. In other embodiments, the digital presentation serve 200 may be configured to periodically transmit or ping connected user devices and attempt to cause presentation of a virtual or augmented reality. Said differently, the digital presentation server 200 may periodically attempt to identify user devices that are communicably coupled to the server 200, if any, and offer to generate a VR or AR environment as described herein. By way of example, the digital presentation server 200 may be associated with a branch location of a financial institution and may identify user devices connected to a network of the branch location.

In some embodiments, the request received at operation 305 may be transmitted by a second user device 106. By way of example, the second user device 106 may be associated with a second user that is an employee of the bank branch. As such, the employee (e.g., financial advisor or the like) may use a second user device 106 associated with the second user to transmit the request to the digital presentation server 200. By way of a particular example, a customer (e.g., a first user) may enter a physical branch location and request assistance with opening an account, applying for a loan, or the like and may be paired with an employee of the bank branch (e.g., a second user). In order to view the various documents required for opening the account, the customer via a first user device 102 (e.g., VR or AR headset) and/or the employee via a second device 106 (e.g., VR or AR headset) may transmit a request to perform the review of these documents (e.g., digital objects) in a VR or AR environment.

Thereafter, as shown in operation 310, the apparatus (e.g., digital presentation server 200) includes means, such as input/output circuitry 206, communication circuitry 208, display circuitry 212, virtual reality circuitry 216, augmented reality circuitry 218, or the like, for causing visual presentation of the digital object to a user. As described hereafter with reference to FIG. 4, the display circuitry 212 may be configured to, based on the first user device 102 and/or the second user device 106, generate a virtual reality environment or augmented reality overlay.

By way of example, in an instance in which the first user device 102 and/or the second user device 106 are VR devices, the display circuitry 212 and, in particular the virtual reality circuitry 216, may cause the first user device 102 and the second user device 106 to generate a virtual reality environment and render the digital object (e.g., documents, forms, etc.) in the virtual reality environment. By way of continued example, the first user device 102 may be worn (e.g., VR headset) by a customer (e.g., first user) and the second user device 106 (e.g., VR device) may be worn by an employee of the banking branch. Upon receiving the request at operation 305, the virtual reality circuitry 216 may transmit instructions to the first user device 102 and the second user device 106 to generate a virtual reality environment for simultaneous viewing by the customer and the employee. In some instances, the virtual reality environment may generate a virtual reality environment that simulates the physical banking branch. However, the present disclosure contemplates that any simulated environment may be generated by the first user device 102 and the second user device 106 (e.g., in response to instructions from the digital presentation server 200).

The display circuitry 212 and virtual reality circuitry 216 may be further configured to render the requested digital object (e.g., document, form, etc.) in the virtual reality environment. Said differently, the display circuitry 212 or virtual reality circuitry 216 may simulate the digital object in the virtual reality environment in a form that is viewable by the user. By way of example, the digital object may correspond to a disclosure document that is viewable by the user via the first user device 102 in the virtual reality environment. Similarly, in some embodiments, the second user device 106 may allow the second user to simultaneously view the disclosure document (e.g., digital object) in the same or separate virtual reality environments. Although described herein with reference to a disclosure document, form, paper, or similar digital object, the present disclosure contemplates that the digital object may include any object, element, video, chart, image, or the like without limitation.

Furthermore, the present disclosure contemplates that the digital object, when rendered in a virtual reality environment, may have any form, shape, dimension, size, or the like to facilitate viewing by the first user.

Figure 4:
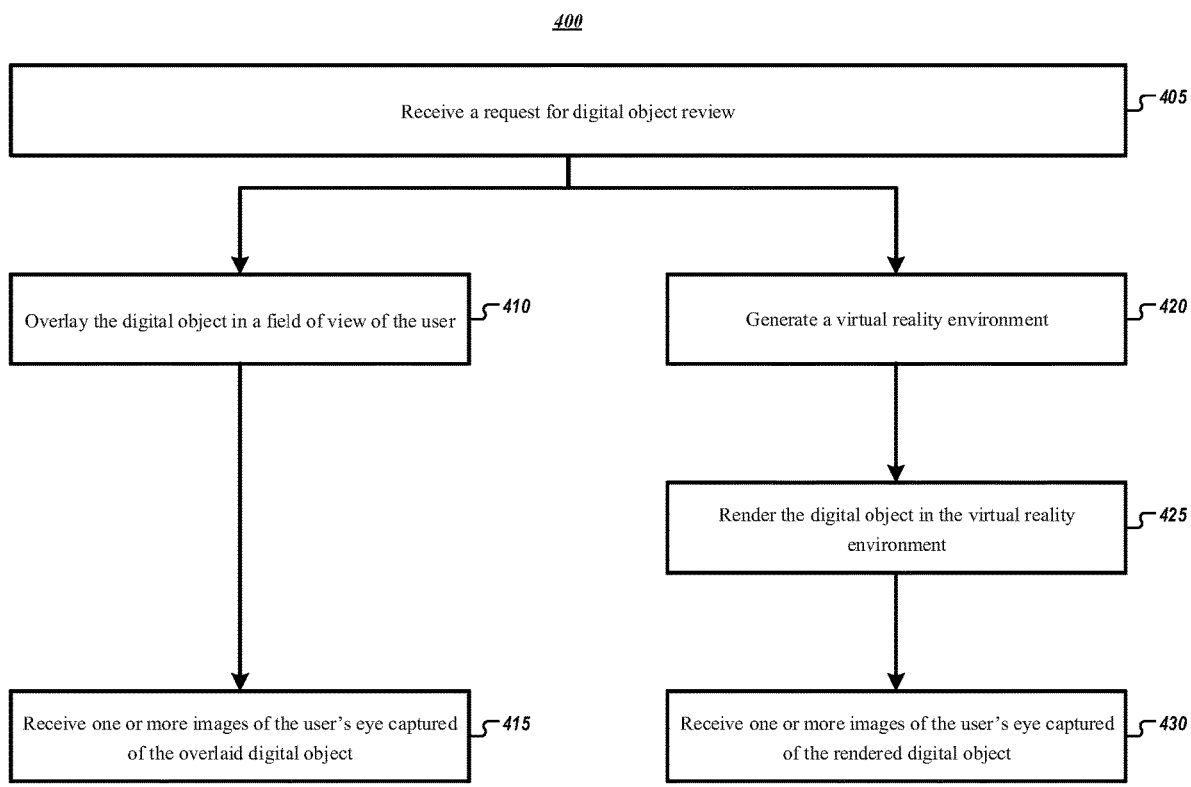
FIG. 4 illustrates an example flowchart for virtual reality (VR) and augmented reality (AR) digital object presentation, in accordance with some example embodiments described herein.

With continued reference to operation 310, and as described hereafter with reference to FIG. 4, in an instance in which the first user device 102 and/or the second user device 106 are AR devices, the display circuitry 212 and/or augmented reality circuitry 218, may cause the first user device 102 and the second user device 106 to generate an augmented reality overlay and overlay the digital object (e.g., documents, forms, etc.) in the field of view of the user (e.g., in a real world environment). By way of continued example, the first user device 102 may be worn (e.g., AR headset, smart glasses, etc.) by a customer (e.g., first user) and the second user device 106 (e.g., AR device, smart glasses, etc.) may be worn by an employee of the banking branch. Upon receiving the request at operation 305, the augmented reality circuitry 218 may transmit instructions to the first user device 102 and the second user device 106 to generate an augmented reality overlay that includes the digital object for simultaneous viewing by the customer (e.g., first user) and the employee (e.g., second user). In some instances, the augmented reality overlay may enhance the real world environment of the physical banking branch as viewed by the first user through the first user device 102.

The display circuitry 212 and augmented reality circuitry 218 may be further configured to overlay the digital object in a field of view of the first user. By way of example, the digital object may correspond to a disclosure document that is viewable by the user via through first user device 102 in a real world environment enhanced by the augmented reality overlay. Similarly, in some embodiments, the second user device 106 may allow the second user to simultaneously view the disclosure document (e.g., digital object) via an overlay of the real world environment. Although described herein with reference to a disclosure document, form, paper, or similar digital object, the present disclosure contemplates that the digital object may include any object, element, video, chart, image, or the like without limitation. Furthermore, the present disclosure contemplates that the digital object, when overlaid via an augmented reality overlay, may have any form, shape, dimension, size, or the like to facilitate viewing by the first user. For example, the digital object may be illustrated to the first user on a piece of paper (e.g., blank piece of paper that exists in the real world environment) such that the content of the digital object is only viewable by the first user device 102 and/or second user device 106.

Thereafter, as shown in operation 315, the apparatus (e.g., digital presentation server 200) includes means, such as processor 202, gaze detection circuitry 210, or the like, for receiving one or more images of the user's eye captured during presentation of the digital object. In some example embodiments, and as described in greater detail below in connection with FIG. 5, operation 315 may include receiving one or more images of a user's eye via a camera (e.g., or equivalent device) of the first user device 102. By way of example, a digital object may be presented to the user as described above with reference to operation 310 such that a context, text, etc. of the digital object is displayed, for example, as a rendering in a virtual reality environment or as an augmented reality overlay. A camera of the first user device 102 or other eye-tacking sensor may begin capturing (e.g., as a video stream, collection of images, or the like) one or more images of a user's eye. The user may begin reading or otherwise viewing the content of the digital object by directing his or her gaze to portions of the digital object (e.g., reading the text of the digital object).

In some embodiments, as shown in operation 320, the apparatus (e.g., digital presentation server 200) includes means, such as processor 202, gaze detection circuitry 210, or the like, for determining a focus location represented by the one or more images. As described hereafter with reference to FIG. 5, the gaze detection circuitry 210 may iteratively determine the relative position of a user's eye (e.g., or any portion of the user's eye, pupil, etc.) relative to the digital object, user's head, or other frame of reference. This relative positioning of the user's eye may be referred to as the user's gaze direction. For each gaze direction, the gaze detection circuitry 210 may identify a corresponding location of the digital object. Said differently, the gaze detection circuitry 210 may receive a plurality of images of a user's eye and determine a gaze direction for each image as well as a corresponding location of the digital object for each gaze direction (e.g., where is the user looking?). Subsequently, the gaze detection circuitry 210 may determine a correlation between the gaze direction and the corresponding location of the digital object in order to determine a focus location.

By way of example, the first user may view a disclosure document (e.g., digital object) via the first user device and may focus or otherwise direct his or her gaze (e.g., attention) to portions of the digital object. The gaze detection circuitry 210 may be configured to determine the corresponding portion of the digital object associated with the user's gaze as described with reference to FIG. 5 and may further associate a time component with this association. Said differently, the gaze detection circuitry 210 may determine an amount of time that the user's gaze is directed to a portion of the digital object. In order to determine a focus location, the gaze detection circuitry 210 may further compare the time component of each gaze direction. This comparison may be used to identify the portion of the digital object at which the user's gaze was directed for the most time (e.g., or any amount of time based on the intended application). By way of continued example, the first user may direct his or her gaze at a portion of the disclosure document (e.g., digital object) that contains content related to a minimum account balance. Said differently, the gaze detection circuitry 210 may determine the content of the portion of the digital object at the focus location for use in modifying operation of the system as described hereafter with reference to operation 325.

In some embodiments, as shown in operation 325, the apparatus (e.g., digital presentation server 200) includes means, such as processor 202, object analysis circuitry 214, or the like, for modifying one or more user parameters associated with the user based on the focus location. As described above, the focus location may be associated with the user's gaze direction and digital object and may further indicate potential concern of the user with respect to the content of the digital object at the focus location. By way of continued example, a disclosure document viewed by the user may include text relating to minimum balance requirements for opening an account. Based upon the gaze detection techniques described herein, the server 200 may determine that the focus location is associated with the portion of the digital object relating the minimum balance requirements.

In some embodiments, the modification of one or more user parameters at operation 325 may refer to a modification of parameters available for review by the second user associated with the second user device 106. For example, the object analysis circuitry 214 may modify user parameters to indicate the first user's potential concern for minimum balance requirements. In response, the second user may review these modifications and adjust discussions with the first user accordingly. In particular, the second user may attempt to reassure the first user regarding these requirements, may attempt to provide alternative options for proceeding, may provide additional information regarding these requirements, and/or the like. This modification at operation 325 may be stored in a user profile regarding the first user or similar storage location so as to inform future interactions with the first user.

In some embodiments, as shown in operation 330, the apparatus (e.g., digital presentation server 200) includes means, such as input/output circuitry 206, display circuitry 212, object analysis circuitry 214, or the like, for augmenting the digital object based on the one or more parameters of the user. The object analysis circuitry 214 may, based on the modifications to the one or more user parameters, adjust, modify, or otherwise change the digital object. By way of continued example, the object analysis circuitry 214 may highlight (e.g., any visual indicator) this portion of the digital content for review with the first user. In some embodiments, the augmenting of the digital object at operation 330 may refer to removing a portion (e.g., the focus location) of the digital object from the digital object. Said differently, the object analysis circuitry 214 may determine the concern of the first user regarding minimum balance requirements and may select a different account opening without a minimum balance such that the digital object no longer includes this focus location (e.g., area of user concern). Although described herein with reference to a single focus location regarding minimum balance, the present disclosure contemplates that any number of focus locations may be determined by the systems described herein. Furthermore the focus locations may be associated with any content type and/or any number of associated modifications may be made to the user parameters in response to this focus location.

In some embodiments, the object analysis circuitry 214 may be configured to augment the digital object by generating a visual representation of the focus location on the digital object. In such an embodiment, the object analysis circuitry 214 may operate to form a heat map or other visualization of representative magnitude of the user's gaze. By way of continued example, the disclosure document (e.g., digital object) may be augmented to include a heat map associated with the first user's gaze at each portion of the disclosure. Said differently, the digital object may be augmented to include a color coded mapping associated with the respective gaze of the user for each portion of the disclosure. Such a heat map may be viewable by the second user via the second user device 106 in order to provide tailored guidance to the first user.

Turning next to FIG. 4, a flowchart is shown for virtual reality (VR) and augmented reality (AR) digital object presentation. The operations illustrated in FIG. 4 may, for example, be performed by, with the assistance of, and/or under the control of an apparatus (e.g., digital presentation server 200), as described above. In this regard, performance of the operations may invoke one or more of processor 202, memory 204, input/output circuitry 206, communications circuitry 208, gaze detection circuitry 210, display circuitry 212, object analysis circuitry 214, virtual reality circuitry 216, and/or augmented reality circuitry 218.

As shown in operation 405, the apparatus (e.g., digital presentation server 200) includes means, such as input/output circuitry 206, communications circuitry 208, or the like, for receiving a request for digital object review. As described above at operation 305, the first user device 102 may be associated with a first user and may, in some embodiments transmit the request for digital object review at operation 405. In other embodiments, the digital presentation serve 200 may be configured to periodically transmit or ping connected user devices and attempt to cause presentation of a virtual or augmented reality. Said differently, the digital presentation server 200 may periodically attempt to identify user devices that are communicably coupled to the server 200, if any, and offer to generate a VR or AR environment as described herein. In other embodiments, the request received at operation 405 may be transmitted by a second user device 106.

As shown in operation 410, the apparatus (e.g., digital presentation server 200) includes means, such as input/output circuitry 206, communications circuitry 208, display circuitry 212, augmented reality circuitry 218, or the like, for overlaying the digital object in a field of view of the user. As described above with reference to operation 310, in an instance in which the first user device 102 and/or the second user device 106 are AR devices, the display circuitry 212 and/or augmented reality circuitry 218, may cause the first user device 102 and the second user device 106 to generate an augmented reality overlay and overlay the digital object (e.g., documents, forms, etc.) in the field of view of the user (e.g., in a real world environment). The display circuitry 212 and augmented reality circuitry 218 may be further configured to overlay the digital object in a field of view of the first user. By way of example, the digital object may correspond to a disclosure document that is viewable by the user via through first user device 102 in a real world environment enhanced by the augmented reality overlay. Similarly, in some embodiments, the second user device 106 may allow the second user to simultaneously view the disclosure document (e.g., digital object) via an overlay of the real world environment.

As shown in operation 415, the apparatus (e.g., digital presentation server 200) includes means, such as input/output circuitry 206, communications circuitry 208, display circuitry 212, augmented reality circuitry 218, gaze detection circuitry 210, or the like, for receiving one or more images of the user's eye captured of the overlaid digital object. As described above, one or more images of a user's eye may be captured via a camera (e.g., or equivalent device) of the first user device 102. In particular, a camera of the first user device 102 or other eye-tacking sensor may begin capturing (e.g., as a video stream, collection of images, or the like) one or more images of a user's eye directed at the overlaid digital object. The user may begin reading or otherwise viewing the content of the digital object by directing his or her gaze to portions of the overlaid digital object (e.g., reading the text of the digital object). Such images may be used by the gaze detection circuitry 210 in determining a focus location represented by the one or more images as described above with reference to operation 320.

As shown in operations 425 and 430, the apparatus (e.g., digital presentation server 200) includes means, such as input/output circuitry 206, display circuitry 212, virtual reality circuitry 216, or the like, for generating a virtual reality environment and rendering the digital object in the virtual reality environment. As described above with reference to operation 310, in an instance in which the first user device 102 and/or the second user device 106 are VR devices, the display circuitry 212 and, in particular, the virtual reality circuitry 216, may cause the first user device 102 and the second user device 106 to generate a virtual reality environment and render the digital object (e.g., documents, forms, etc.) in the virtual reality environment. Upon receiving the request at operation 405, the virtual reality circuitry 216 may transmit instructions to the first user device 102 and the second user device 106 to generate a virtual reality environment for simultaneous viewing by the customer and the employee. The display circuitry 212 and virtual reality circuitry 216 may be further configured to render the requested digital object (e.g., document, form, etc.) in the virtual reality environment. Said differently, the display circuitry 212 or virtual reality circuitry 216 may simulate the digital object in the virtual reality environment in a form that is viewable by the user.

Thereafter, as shown in operation 430, the apparatus (e.g., digital presentation server 200) includes means, such as input/output circuitry 206, communications circuitry 208, display circuitry 212, virtual reality circuitry 216, gaze detection circuitry 210, or the like, for receiving one or more images of the user's eye captured of the rendered digital object. As described above, one or more images of a user's eye may be captured via a camera (e.g., or equivalent device) of the first user device 102. In particular, a camera of the first user device 102 or other eye-tacking sensor may begin capturing (e.g., as a video stream, collection of images, or the like) one or more images of a user's eye directed at the digital object rendered in a virtual reality environment. The user may begin reading or otherwise viewing the content of the digital object by directing his or her gaze to portions of the rendered digital object (e.g., reading the text of the digital object). Such images may be used by the gaze detection circuitry 210 in determining a focus location represented by the one or more images as described above with reference to operation 320.

Figure 5:
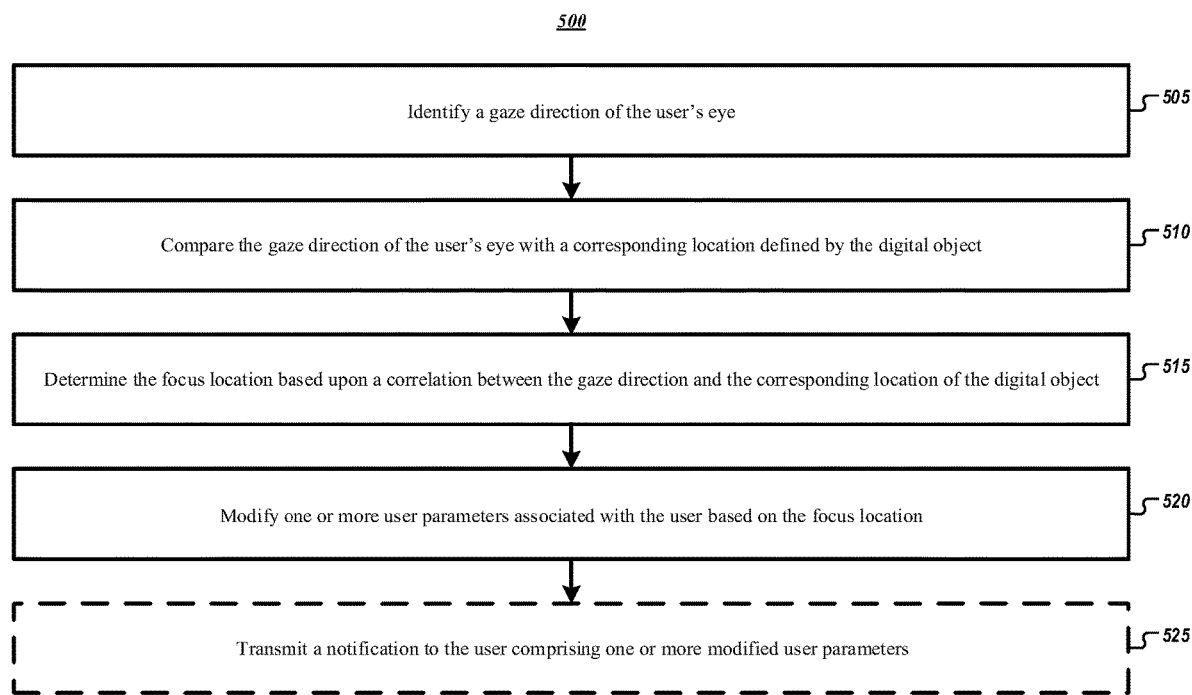
FIG. 5 illustrates an example flowchart for focus location determinations, in accordance with some example embodiments described herein.

Turning next to FIG. 5, a flowchart is shown for focus location determinations. The operations illustrated in FIG. 5 may, for example, be performed by, with the assistance of, and/or under the control of an apparatus (e.g., digital presentation server 200), as described above. In this regard, performance of the operations may invoke one or more of processor 202, memory 204, input/output circuitry 206, communications circuitry 208, gaze detection circuitry 210, display circuitry 212, object analysis circuitry 214, virtual reality circuitry 216, and/or augmented reality circuitry 218.

As shown in operation 505, the apparatus (e.g., digital presentation server 200) includes means, such as input/output circuitry 206, gaze detection circuitry 210, or the like, for identifying a gaze direction of the user's eye. As described above with reference to FIG. 3, the gaze detection circuitry 210 may receive one or more images of a user's eye via a camera (e.g., or equivalent device) of the user device 102. By way of example, a camera of a mobile phone may capture (e.g., as a video stream, collection of images, or the like) one or more images of a user's eye during review of the digital object. In order to determine the gaze direction at operation 505, the gaze detection circuitry 210 may identify a user's face, eye, pupil, and/or other related features captured in the one or more images of the user's eye. In some embodiments, the gaze detection circuitry 210 may further identify a vector between the center of the user's pupil and a reflection (e.g., corneal reflections) on the user's eye as a result of the presented digital object. This vector may be indicative of the user's gaze direction. While described herein with reference to vector techniques and corneal reflections, the present disclosure contemplates that any eye tracking or gaze detection technique (e.g., active light, dark pupil, bright pupil, passive light, and/or the like) may be used to determine the gaze direction of the user's eye. Given that a period of time may elapse during review of the digital object, the gaze direction of the user's eye may be iteratively identified over the time in which the identification code is inputted.

Thereafter, as shown in operations 510, 515 the apparatus (e.g., digital presentation server 200) includes means, such as processor 202, gaze detection circuitry 210, or the like, for comparing the gaze direction of the user's eye with a corresponding location defined by the digital object and determining the focus location based upon the correlation, respectively. As would be evident to one of ordinary skill in the art in light of the present disclosure, the digital object (e.g., disclosure or other document) may define various location (e.g., text sections, paragraphs, etc.) each associated with content of the digital object. These respective locations may be known by or otherwise provided to the gaze detection circuitry 210 for comparison with the gaze direction(s) of the user's eye identified at operation 505. The gaze detection circuitry 210 may compare the known location of each portion of the digital object with each gaze direction in order to determine one or more focus locations of the user.

Thereafter, as shown in operation 520, the apparatus (e.g., digital presentation server 200) includes means, such as processor 202, object analysis circuitry 214, or the like, for modifying one or more user parameters associated with the user based on the focus location. As described above with reference to operation 325, the focus location may be associated with the user's gaze direction and digital object and may further indicate potential concern of the user with respect to the content of the digital object at the focus location. By way of continued example, a disclosure document viewed by the user may include text relating to minimum balance requirements for opening an account. Based upon the gaze detection techniques described herein, the server 200 may determine that the focus location is associated with the portion of the digital object relating the minimum balance requirements.

In some embodiments, as shown in operations 525 the apparatus (e.g., digital presentation server 200) includes means, such as processor 202, communications circuitry 208, or the like, for transmitting a notification to the user (e.g., first user device 102) comprising one or more modified user parameters. By way of continued example, the modification of one or more user parameters at operation 520 may refer to a modification of parameters available for review by the second user associated with the second user device 106. For example, the object analysis circuitry 214 may modify user parameters to indicate the first user's potential concern for minimum balance requirements. In response, the second user may review these modifications and adjust discussions with the first user accordingly. In particular, the second user may attempt to reassure the first user regarding these requirements, may attempt to provide alternative options for proceeding, may provide additional information regarding these requirements, and/or the like. At operation 525, in some embodiments, the server 200 may transmit a notification to the user that includes the modification to the user parameters (e.g., modified user parameters). For example the notification may indicate to the user that assistance may be provided regarding the minimum balance requirements associated with the account opening.

In doing so, the embodiments of the present disclosure solve issues regarding digital object presentation, customer insight development, and document security. The embodiments of the present disclosure leverage virtual reality (VR) and/or augmented realty (AR) to provide a secure environment for customer interactions. In operation, embodiments of the present disclosure receive a request for digital object review (e.g., documents or the like) and cause visual presentation of the digital object to the user in a VR or AR environment. During review of the digital object in the VR or AR environment, the system capture images of the user's eye to determine one or more focus locations of the user with respect to the digital object. As such, the system operates to determine or otherwise map locations of interest of the digital object (e.g., associated with increased focus of the user) while protecting private user information in the VR or AR environment (e.g., only viewable by the user). In this way, the inventors have identified that the advent of emerging computing technologies have created a new opportunity for solutions for securely presenting digital content and determining customer insights which were historically unavailable. In doing so, such example implementations confront and solve at least two technical challenges: (1) they reliably secure user data from unauthorized viewing, and (2) they determine customer insights in a virtual environment (e.g., without the need for physical forms).

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the digital presentation server 200 and executed by a processor 202 of the digital presentation server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Conclusion

Many modifications of the embodiments set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for securely presenting digital objects, the method comprising:
   generating, via virtual reality circuitry of a computing device, at least one of i) a virtual reality environment or ii) an augmented reality environment;
   receiving, by the computing device, a request for digital object review;
   rendering, via the virtual reality circuitry, a digital object in either the virtual reality environment or the augmented reality environment in response to the request for digital object review;
   causing, by display circuitry of the computing device, visual presentation of the digital object within the virtual reality environment or the augmented reality environment to a first user via a first user device and a second user via a second user device;
   receiving, by gaze detection circuitry, one or more images of the first user's eye captured during presentation of the digital object;
   determining, by the gaze detection circuitry, a focus location represented by the one or more images; and
   augmenting, via object analysis circuitry, the digital object based on the focus location, wherein augmenting the digital object comprises one or more of (i) visually indicating a portion of the digital object corresponding to the focus location, (ii) removing a portion of the digital object corresponding to the focus location, (iii) replacing a portion of the digital object corresponding to the focus location, or (iv) generating a new digital object that does not include content corresponding to the focus location.

2. The method according to claim 1, wherein causing presentation of the digital object further comprises overlaying, via augmented reality circuitry of the computing device, the digital object in a field of view of the first user and the second user.

3. The method according to claim 2, wherein the digital object corresponds to a document in a real-world environment and the digital object is overlaid with respect to the document.

4. The method according to claim 1, further comprising transmitting, via the computing device, a notification to the second user comprising one or more modified first user parameters.

5. The method according to claim 1, wherein determining the focus location further comprises:
   identifying, via the gaze detection circuitry, a gaze direction of the first user's eye;

comparing, via the gaze detection circuitry, the gaze direction of the first user's eye with a corresponding location defined by the digital object; and determining, via the gaze detection circuitry, the focus location based upon a correlation between the gaze direction and the corresponding location of the digital object.

6. The method according to claim 1, further comprising:

modifying, by the object analysis circuitry of the computing device, one or more user parameters associated with the first user based on the focus location; and generating, via the object analysis circuitry, a visual representation of the focus location on the digital object, wherein the visual representation of the focus location on the digital object is solely viewable by the second user via the second user device.

7. The method according to claim 6, wherein the visual representation of the focus location is visually representative of a magnitude of the first user's gaze with respect to the digital object.

8. An apparatus for securely presenting digital objects, the apparatus comprising:

communications circuitry configured to receive a request for digital object review; and virtual reality circuitry configured to:
 generate at least one of i) a virtual reality environment or ii) an augmented reality environment; and
 render a digital object in either the virtual reality environment or the augmented reality environment in response to the request for digital object review;

display circuitry configured to cause visual presentation of the digital object within the virtual reality environment or the augmented reality environment to a first user via a first user device and a second user via a second user device;

gaze detection circuitry configured to:
 receive one or more images of the first user's eye captured during presentation of the digital object; and
 determine a focus location represented by the one or more images; and object analysis circuitry configured to:
 augment the digital object based on the focus location, wherein augmenting the digital object comprises one or more of (i) visually indicating a portion of the digital object corresponding to the focus location, (ii) removing a portion of the digital object corresponding to the focus location, (iii) replacing a portion of the digital object corresponding to the focus location, or (iv) generating a new digital object that does not include content corresponding to the focus location.

9. The apparatus according to claim 8, further comprising augmented reality circuitry configured to overlay the digital object in a field of view of the first user and the second user.

10. The apparatus according to claim 9, wherein the digital object corresponds to a document in a real-world environment and the digital object is overlaid with respect to the document.

11. The apparatus according to claim 8, wherein the communications circuitry is further configured to transmit a notification to the second user comprising one or more modified first user parameters.

12. The apparatus according to claim 8, wherein the gaze detection circuitry is further configured to:

identify a gaze direction of the first user's eye;

compare the gaze direction of the first user's eye with a corresponding location defined by the digital object; and determine the focus location based upon a correlation between the gaze direction and the corresponding location of the digital object.

13. The apparatus of claim 8, wherein object analysis circuitry is further configured to:

modify one or more user parameters associated with the first user based on the focus location; and generate a visual representation of the focus location on the digital object, wherein (i) the visual representation of the focus location is visually representative of a magnitude of the first user's gaze with respect to the digital object and (ii) the visual representation of the focus location on the digital object is solely viewable by the second user via the second user device.

14. The apparatus according to claim 13, wherein the visual representation of the focus location is visually representative of a magnitude of the first user's gaze with respect to the digital object.

15. A non-transitory computer-readable storage medium for using an apparatus for securely presenting digital objects, the non-transitory computer-readable storage medium storing instructions that, when executed, cause the apparatus to:

generate at least one of i) a virtual reality environment or ii) an augmented reality environment;

receive a request for digital object review;

render a digital object in either the virtual reality environment or the augmented reality environment in response to the request for digital object review;

cause visual presentation of the digital object within the virtual reality environment or the augmented reality environment to a first user via a first user device and a second user via a second user device;

receive one or more images of the first user's eye captured during presentation of the digital object;

determine a focus location represented by the one or more images; and augment the digital object based on the focus location, wherein augmenting the digital object comprises one or more of (i) visually indicating a portion of the digital object corresponding to the focus location, (ii) removing a portion of the digital object corresponding to the focus location, (iii) replacing a portion of the digital object corresponding to the focus location, or (iv) generating a new digital object that does not include content corresponding to the focus location.

16. The non-transitory computer-readable storage medium according to claim 15, wherein the instructions when executed, further cause the apparatus to overlay the digital object in a field of view of the first user and the second user.

17. The non-transitory computer-readable storage medium according to claim 16, wherein the digital object corresponds to a document in a real-world environment and the digital object is overlaid with respect to the document.

18. The non-transitory computer-readable storage medium according to claim 15, wherein the instructions when executed, further cause the apparatus to:

identify a gaze direction of the first user's eye;

compare the gaze direction of the first user's eye with a corresponding location defined by the digital object; and determine the focus location based upon a correlation between the gaze direction and the corresponding location of the digital object.

19. The non-transitory computer-readable storage medium of claim 15, wherein the instructions when executed, further cause the apparatus to:
modify one or more user parameters associated with the first user based on the focus location; and
generate a visual representation of the focus location on the digital object, wherein (i) the visual representation of the focus location is visually representative of a magnitude of the first user's gaze with respect to the digital object and (ii) the visual representation of the focus location on the digital object is solely viewable by the second user via the second user device.

20. The non-transitory computer-readable storage medium of claim 19, wherein the visual representation of the focus location is visually representative of a magnitude of the first user's gaze with respect to the digital object.

\* \* \* \* \*